June 28, 1932.     I. J. DAVIS     1,864,641
LICENSE PLATE HOLDER
Filed March 6, 1930
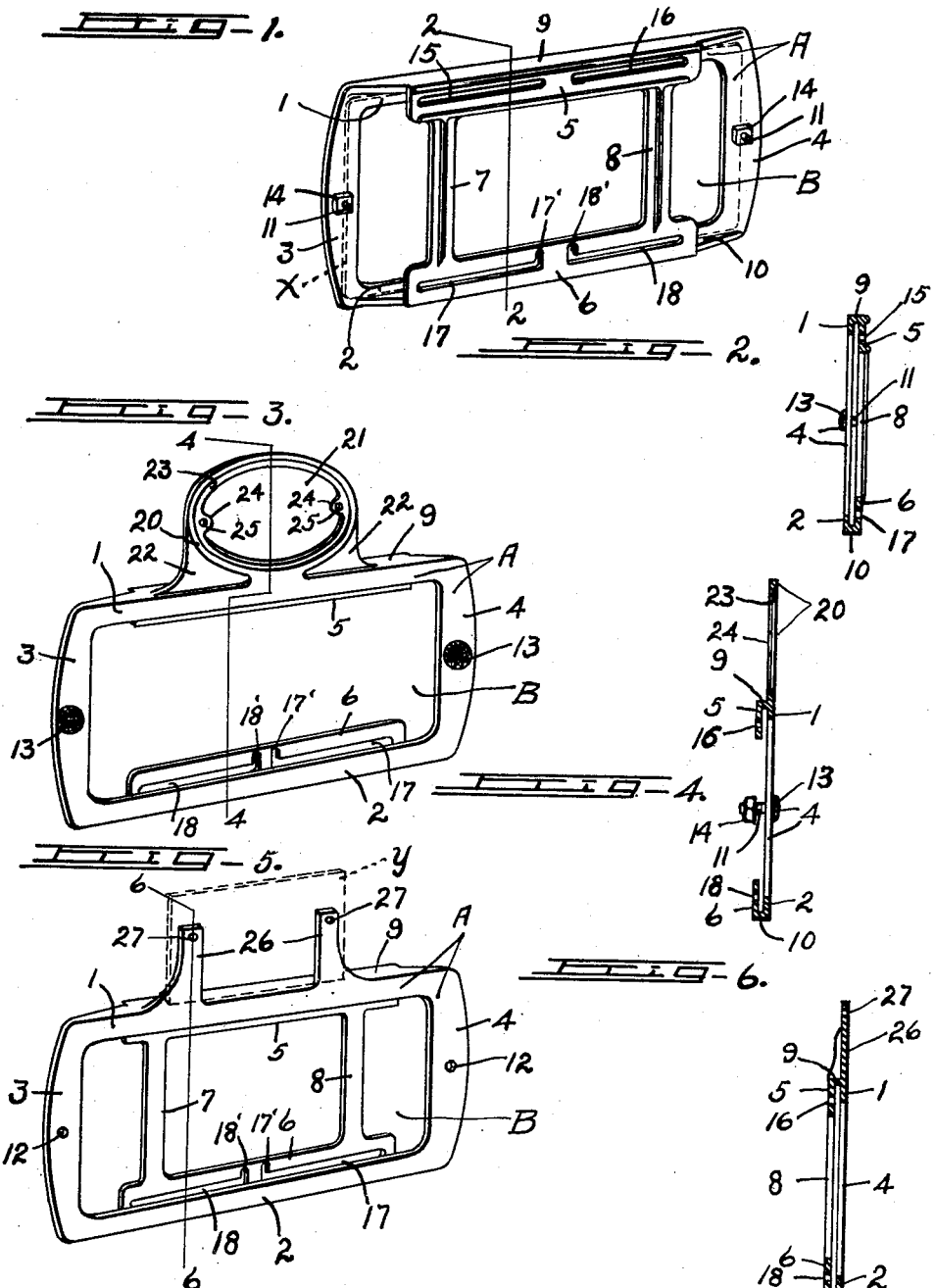
WITNESS
H. L. Meade.
INVENTOR
By Irving J. Davis,
Denison & Thompson
ATTORNEYS Patented June 28, 1932

1,864,641

UNITED STATES PATENT OFFICE

IRVING J. DAVIS, OF SYRACUSE, NEW YORK

LICENSE PLATE HOLDER

Application filed March 6, 1930. Serial No. 433,773.

This invention relates to certain new and useful improvements in license plate holders.

In the construction and application of frames or holders for automobile license plates, it has been found desirable that the frames or holders be artistically designed so as to present a neat finished appearance in harmony with the automobile to protect and maintain the plate in its original condition and appearance and, at the same time, be adapted to be readily secured to any of the usual license plate holders provided by the manufacturer with the car.

The main object of this invention, therefore, is to provide a comparatively simple, durable and artistically constructed device for securely supporting and holding the license plate of an automobile.

Another object is to provide a holder or frame which may be quickly and easily secured to any of the usual license plate holders now provided on automobiles.

A further object is to provide a holder which may be readily applied to the usual license plate holder in such a manner as to position the license plate most advantageously; that is, where the view of the plate is least unobstructed by any portion of the car, such as a bumper, carrier, etc.

Still another object is to provide a license plate frame or holder which is equally well adapted to support an emblem, insignia, or the like.

Other objects and advantages relating to the structure and form and relation of the parts thereof will more fully appear from the following description taken in connection with the accompanying drawing in which:

Figure 1 is a perspective rear view of a license plate holder embodying the various features of this invention.

Figure 2 is a transverse sectional view taken on line 2—2, Figure 1.

Figure 3 is a perspective view of a modified form of license plate holder provided with means for supporting an emblem or insignia thereon.

Figure 4 is a transverse sectional view taken on line 4—4, Figure 3.

Figure 5 is a perspective view showing still another means of securing an emblem or insignia to the license plate holder.

Figure 6 is a transverse sectional view taken on line 6—6, Figure 5.

As illustrated in the drawing, this invention consists of a rectangular front frame —A— formed of a pair of longitudinally disposed bars —1— and —2— arranged in parallel spaced relation and connected at their ends by a pair of transversely disposed bars —3— and —4— made integral with the bars —1— and —2— and which have their opposed edges arranged in parallel spaced relation to co-operate with the bars —1— and —2— in forming a central substantially rectangular opening —B— through the frame —A— which has the length and width thereof slightly less than the respective length and width of the usual license plate as —X— indicated by dotted lines in Figure 1.

A pair of guide bars —5— and —6— of less length than that of the opening —B— are arranged in parallel spaced relation at the rear of and in spaced relation to respective longitudinal bars —1— and —2—. The bars —5— and —6— are arranged symmetrically with respect to the frame —A—, with their opposite edges spaced apart a less distance than the width of the opening —B— in the frame —A—, and are preferably connected together by a pair of ribbed cross bars —7— and —8— arranged in parallel spaced relation adjacent respective ends of the bars —5— and —6— to materially increase the rigidity of the frame, although in some instances these bars may be omitted as indicated in the modified form of license plate holder, Figures 3 and 4.

The guide bars —5— and —6— and the bars —1— and —2— are connected by respective walls —9— and —10— which are made integral with the outer edges of the respective bars and are adapted to maintain said bars in parallel spaced relation a distance substantially equal to the thickness of the ordinary license plate, while the opposed faces of the walls —9— and —10— are spaced apart a distance substantially equal to the width of the license plate so that the plate can be slid endwise between the walls —9— and —10— and be confined adjacent the rear face of the frame —A— by the guide bars —5— and —6—. In other words, the guide bars —5— and —6—, together with the cross bars —7— and —8— constitute a second frame member which is connected with and maintained in spaced relation to the rear side of the frame —A— for the purpose of receiving and maintaining the usual automobile license plate therebetween.

The walls —9— and —10— extend substantially the full length of the respective guide bars —5— and —6— with the ends —5'— and —6'— thereof tapered outwardly and forwardly therefrom to the rear face of the frame —A— so as to form a support for substantially the entire length of the longitudinal edges of the license plate.

The plate —X— may be rigidly maintained against endwise movement in the frame in any suitable manner as by a bolt or screw —11— positioned in suitable openings —12— provided intermediate the ends of the end bars —3— and —4— of the frame —A— and spaced apart a distance substantially equal to the length of the license plate —X—.

The bolts or screws —11— may be provided with an ornamented or jeweled head as —13—, Figure 3, adapted to be positioned adjacent the outer face of the frame —A— while the other end of each of the bolts is threaded to receive a nut —14— for maintaining the bolts in place and which contact with the rear face of the license plate for clamping the plate between the nut and the frame —A—.

The guide bar —5— is formed with two elongated slots —15— and —16— which extend lengthwise of the bar in a plane within the opening —B— from near the outer end of the bar inwardly and terminate in spaced relation at respective sides of the center of the bar —5—. The bar —6— is likewise provided with a pair of elongated slots —17— and —18— which extend lengthwise thereof and in a plane at one side of the opening —B—. The slots —17— and —18— extend inwardly similarly to the slots —15— and —16— from near the respective outer ends of the bar —6—, with their adjacent ends terminating in spaced relation in an inwardly extending portion —17'— and 18'— respectively, for the purpose of permitting a bolt to be entered therethrough from the front side of the frame and then moved along the respective slots —17— or —18— as desired, with the heads of the bolts positioned between the bar —6— and frame —A—. These slots —15—, —16—, —17— and —18— are provided to form passageways for bolts used in securing the license holder to the support of different widths as ordinarily provided upon automobiles.

It is usually necessary to use but one set of the slots at a time, but the two sets are provided for the purpose of making the holder applicable for mounting the license plate in an unobstructed position upon all makes of cars without, in any way, necessitating the changing or altering of the license plate holder.

In Figures 3, 4, 5 and 6 are shown modified forms of the plate holder shown in Figures 1 and 2 in that the frame is provided with means whereby an insignia or emblem may be readily secured thereto.

In Figures 3 and 4, the frame —A— is shown provided with an integral upwardly extending oval frame —20— connected at its lower central portion to the upper edge of the bar —1— and having an oval opening —21— therein adapted to receive an emblem or the like, not shown. The frame —20— and opening —21— are arranged symmetrically with respect to the frame —A—, and the frame —20— is further connected with the frame —A— by means of relatively thin web portions —22— extending from respective outer edges of the oval frame to the wall —5—.

The frame —20— is provided with a recess —23— in the inner face thereof adjacent the opening —21— for receiving the emblem while a pair of inwardly projecting ears or lugs —24— are provided at diametrically opposite sides of the opening —21— which have an opening as —25— therethrough adapted to receive a screw or bolt for the purpose of permitting the emblem to be secured in place.

In Figures 5 and 6, the emblem support consists of a pair of integrally upwardly projecting arms —26— arranged at equal distances either side of the center of the frame —A— and provided at their upper ends with suitable openings —27— therethrough for receiving a bolt or screw used in securing the emblem to the license holder.

It is evident that the construction illustrated in Figures 5 and 6 is more universal in use than the one shown in Figures 3 and 4 in that the emblem or insignia as —Y— may not be of a particular size and outline as is necessary in the latter construction, but may be of various sizes and forms without it being necessary to alter the design or positioning of the arms —26—.

Although I have shown and described a specific construction of license plate holder, I do not wish to be limited to the exact construction shown, as various changes and modifications may readily be made without departing from the spirit of the invention, as set forth in the appended claims.

I claim:

1. A license plate holder for automobiles comprising an integral substantially rectangular frame having an opening therethrough adapted to disclose the license plate and integral means adapted to support an emblem in a plane at one side thereof and a pair of longitudinally extending bars arranged parallel with respective longitudinal sides of the frame and integrally connected to and spaced from said frame by longitudinally extending parallel spaced walls to permit a license plate to be slid between the frame and the longitudinal bars, each of said bars having a pair of longitudinally extending slots, said slots in the bar adjacent the emblem supporting means being arranged within the plane of said frame opening and the other pair of slots positioned in a plane at one side of said opening and provided with lateral portions extending in the plane within said opening for permitting bolts to be entered into the slots from the opposite side of the frame.

2. A license plate holder for automobiles comprising an integral substantially rectangular frame having an opening therethrough adapted to disclose the license plate and integral means adapted to support an emblem in a plane at one side thereof, a second substantially rectangular frame arranged in parallel spaced relation with one side of the first-mentioned frame and integrally connected thereto by longitudinally extending parallel spaced walls to permit a license plate to be slid between said frames, each of the opposite longitudinal sides of the second-mentioned frame being provided with a pair of longitudinally extending slots, said slots adjacent the emblem supporting means being arranged in a plane within the frame opening and the other pair of slots positioned in a plane at one side of said opening and provided with lateral portions extending in a plane within said opening for permitting bolts to be entered into the slots from the opposite side of the first-mentioned frame.

3. A license plate holder for automobiles comprising an integral substantially rectangular frame having an opening therethrough adapted to disclose the license plate and integral means adapted to support an emblem in a plane at one side thereof, a second substantially rectangular frame arranged in parallel spaced relation with one side of the first-mentioned frame and integrally connected thereto by longitudinally extending parallel spaced walls to permit a license plate to be slid between said frames, the longitudinal side of the second-mentioned frame opposite said emblem-supporting means being provided with a pair of longitudinally extending slots arranged in a plane at one side of the frame opening and provided with lateral portions extending in a plane within said opening for permitting bolts to be entered into the slots from the opposite side of the first-mentioned frame.

4. A license plate holder for automobiles comprising an integral substantially rectangular frame having an opening therethrough adapted to disclose the license plate, a second substantially rectangular frame arranged in parallel spaced relation with one side of the first-mentioned frame and integrally connected thereto by longitudinally extending parallel spaced walls to permit a license plate to be slid between said frames, one of the longitudinal sides of the second-mentioned frame being provided with a pair of longitudinally extending slots arranged in a plane at one side of said frame opening and provided with lateral portions extending in a plane within said opening for permitting bolts to be entered into the slots from the opposite side of the first-mentioned frame.

In witness whereof I have hereunto set my hand this 5th day of March 1930.

IRVING J. DAVIS.